US011077865B2

(12) United States Patent
Schwabe et al.

(10) Patent No.: US 11,077,865 B2
(45) Date of Patent: Aug. 3, 2021

(54) METHOD FOR OPERATING A TWO-WHEELED VEHICLE, A DEVICE, AND A TWO-WHEELED VEHICLE

(71) Applicant: Robert Bosch GmbH, Stuttgart (DE)

(72) Inventors: Klaus Schwabe, Petting (DE); Matthias Moerbe, Ilsfeld-Helfenberg (DE)

(73) Assignee: Robert Bosch GmbH, Stuttgart (DE)

(*) Notice: Subject to any disclaimer, the term of this patent is extended or adjusted under 35 U.S.C. 154(b) by 198 days.

(21) Appl. No.: 16/310,129

(22) PCT Filed: Apr. 12, 2017

(86) PCT No.: PCT/EP2017/058846
§ 371 (c)(1),
(2) Date: Dec. 14, 2018

(87) PCT Pub. No.: WO2018/001588
PCT Pub. Date: Jan. 4, 2018

(65) Prior Publication Data
US 2019/0329793 A1 Oct. 31, 2019

(30) Foreign Application Priority Data
Jun. 27, 2016 (DE) ...................... 10 2016 211 427.1

(51) Int. Cl.
*B60W 50/14* (2020.01)
*B60K 35/00* (2006.01)
(Continued)

(52) U.S. Cl.
CPC ............. *B60W 50/14* (2013.01); *B60K 35/00* (2013.01); *B60W 40/064* (2013.01);
(Continued)

(58) Field of Classification Search
CPC .. B60W 50/14; B60W 40/064; B60W 40/112; B60K 35/00; B62J 27/00; B62J 45/4151; B62J 50/20; G08G 1/16
See application file for complete search history.

(56) References Cited

U.S. PATENT DOCUMENTS 6,034,594 A    3/2000   Gray
2005/0212254 A1* 9/2005 Heitner ................... B62H 1/10
                                                                  280/298
(Continued)

FOREIGN PATENT DOCUMENTS

CN    205059861 U    3/2016
DE    10235378 A1   2/2004
(Continued)

OTHER PUBLICATIONS

English translation JP2015040020A.*
(Continued)

*Primary Examiner* — Rami Khatib
*Assistant Examiner* — Gabriel J Lambert
(74) *Attorney, Agent, or Firm* — Norton Rose Fulbright US LLP; Gerard Messina

(57) ABSTRACT

A method is described for operating a two-wheeled vehicle, in particular a motorcycle, on a roadway, the method including the following steps: ascertaining an instantaneous coefficient of friction between at least one wheel of the two-wheeled vehicle and the roadway; calculating a critical tilt angle of the two-wheeled vehicle as a function of at least the instantaneous coefficient of friction; detecting an instantaneous tilt angle of the two-wheeled vehicle; determining the distance between the instantaneous tilt angle and the critical tilt angle; and outputting an item of information to the driver as a function of the determined distance.

11 Claims, 3 Drawing Sheets

(51) Int. Cl.
  *B60W 40/064* (2012.01)
  *B60W 40/112* (2012.01)
  *B62J 27/00* (2020.01)
  *G08G 1/16* (2006.01)
  *B62J 45/415* (2020.01)
  *B62J 50/20* (2020.01)

(52) U.S. Cl.
  CPC ............ *B60W 40/112* (2013.01); *B62J 27/00* (2013.01); *G08G 1/16* (2013.01); *B62J 45/4151* (2020.02); *B62J 50/20* (2020.02)

(56) References Cited

U.S. PATENT DOCUMENTS

| | | | | |
|---|---|---|---|---|
| 2010/0071984 | A1* | 3/2010 | Doi | B62K 11/007 180/218 |
| 2011/0106458 | A1* | 5/2011 | Shiozawa | B60W 40/068 702/41 |
| 2012/0008048 | A1* | 1/2012 | Sekine | G06T 19/006 348/566 |
| 2012/0259479 | A1* | 10/2012 | Yoneta | G07C 5/08 701/1 |
| 2013/0282253 | A1* | 10/2013 | Ono | B60T 8/1755 701/72 |
| 2015/0127240 | A1* | 5/2015 | Nozawa | B60W 10/06 701/82 |
| 2015/0203110 | A1* | 7/2015 | Moerbe | B60T 8/1755 701/72 |
| 2015/0217825 | A1* | 8/2015 | Tamura | B62J 27/00 340/905 |
| 2016/0253049 | A1* | 9/2016 | Wild | B60K 35/00 715/763 |
| 2016/0300372 | A1* | 10/2016 | Molin | G06T 7/60 |
| 2017/0158195 | A1* | 6/2017 | Uchida | B60W 30/143 |
| 2017/0247042 | A1* | 8/2017 | Seidl | B60W 30/18145 |
| 2019/0054924 | A1* | 2/2019 | Ambruzs | B60W 40/112 |

FOREIGN PATENT DOCUMENTS

| | | | |
|---|---|---|---|
| DE | 102005059216 A1 | 1/2007 | |
| DE | 102010001050 A1 * | 7/2011 | ............ B60K 37/02 |
| DE | 102012201802 A1 | 8/2013 | |
| DE | 102014225625 A1 | 6/2016 | |
| EP | 1097054 A2 | 5/2001 | |
| EP | 1989086 A1 | 11/2008 | |
| JP | H063257 A | 1/1994 | |
| JP | 2007112316 A | 5/2007 | |
| JP | 2015040020 A * | 3/2015 | ............ B60T 8/172 |
| JP | 2015040020 A | 3/2015 | |
| JP | 2016134173 A * | 7/2016 | ............ B60W 50/14 |
| WO | 2005038746 A1 | 4/2005 | |
| WO | 2009077264 A1 | 6/2009 | |
| WO | 2013/131674 A1 | 9/2013 | |

OTHER PUBLICATIONS

English translation JP2016134173A.*
English translation DE102010001050A1.*
International Search Report for PCT/EP2017/058846, dated Jun. 28, 2017.

* cited by examiner

METHOD FOR OPERATING A TWO-WHEELED VEHICLE, A DEVICE, AND A TWO-WHEELED VEHICLE

FIELD OF THE INVENTION

The present invention relates to a method for operating a two-wheeled vehicle, in particular a motorcycle, on a roadway.

In addition, the present invention relates to a device for operating a two-wheeled vehicle and to a two-wheeled vehicle.

BACKGROUND INFORMATION

Methods for operating a two-wheeled vehicle or a motorcycle on a roadway are known from the related art. It is believed that available art discusses a motorcycle that warns a driver of the motorcycle of a dangerous situation, such as a critical tilt angle that may lead to a fall. For this purpose, both an instantaneous tilt angle and the critical tilt angle of the motorcycle are calculated with the aid of wheel-speed sensors and inertial sensors. If the instantaneous tilt angle reaches the critical tilt angle, then the driver is haptically alerted to the dangerous situation with the aid of an actuator. European Patent No. 1 989 086 discusses a method for determining a roll angle or a tilt angle of a motorcycle in order to ensure safe braking while cornering. On the one hand, the tilt angle is determined from a roll rate ascertained with the aid of a yaw-rate sensor, and on the other hand, it is determined from the product of a yaw rate and a driving speed of the motorcycle. To determine the roll angle, an engine speed, a wheel speed and/or a wheel slip, for example, are taken into account. German Published Patent Application No. 10 2012 201 802 discusses a driver-assistance system, which is designed to ascertain a limit value of a tilt angle that is maximally to be assumed by a two-wheeled vehicle while cornering. For this purpose, an instantaneous tilt angle during cornering is determined while monitoring a driver-specific driving behavior, and the limit value for the tilt angle to be maximally assumed is ascertained taking the instantaneous tilt angle into account. In addition, a characteristic of an upcoming curve to be traveled by the two-wheeled vehicle is ascertained and a tilt angle to be assumed in the upcoming curve is predicted. If the predicted tilt angle is greater than the tilt angle likely driven by a driver of the two-wheeled vehicle, then an optical or acoustic warning signal will be output. German Patent No. 102 35 378 discusses a method for a brake control for a two-wheeled vehicle. In this case, using a yaw-rate sensor, a lateral inclination of the two-wheeled vehicle is detected, and the brake control is carried out as a function of the detected lateral inclination. It is provided that slip-threshold values of a brake-control system are reduced with an increasing tilt angle. German Published Patent Application No. 10 2005 059 216 discusses an information device for a driver of a motorcycle by which a driving state, in particular during cornering, is able to be described. In this context it is provided that a continuously measured physical variable describing the driving state is subjected to a comparison with a reference value and that the result of this comparison is displayed to the driver.

SUMMARY

According to the present invention, it is provided to carry out the present method using the following steps: Ascertaining an instantaneous coefficient of friction between at least one wheel of the two-wheeled vehicle and the roadway; calculating a critical tilt angle of the two-wheeled vehicle as a function of at least the instantaneous coefficient of friction; detecting an instantaneous tilt angle of the two-wheeled vehicle; determining the distance of the instantaneous tilt angle from the critical tilt angle; and outputting an item of information to the driver as a function of the determined distance. The method according to the present invention has the advantage that controlled and safe driving is made possible for a driver of the two-wheeled vehicle. For example, due to the output information, the driver is able to adapt his or her instantaneous driving behavior to a physically possible driving behavior while driving, the physically possible driving behavior depending on the critical tilt angle. The risk that the driver of the two-wheeled vehicle drives at an instantaneous tilt angle that corresponds to the critical tilt angle and thus may fall in the course of cornering is minimized. This reduces an accident risk and at the same time increases the safety both of the driver and of road users present in the environment of the driver. In addition, with the aid of the present method, the driver becomes more familiar with the possibilities of his two-wheeled vehicle, thereby allowing the driver to optimize his or her driving style.

According to one preferred further development of the present invention, it is provided that the instantaneous coefficient of friction is ascertained during an acceleration and/or a braking operation. This offers the advantage that the coefficient of friction is always current or is updated during a driving operation. This ensures that an instantaneous roadway condition, which is defined by a dry, wet or an icy roadway, for example, and thus the associated critical tilt angle, is known at all times. The coefficient of friction is preferably ascertained with the aid of an algorithm, from a slope of an in particular predefinable coefficient of friction/slip curve. In the process, the slip or a slip value during the acceleration and/or the braking operation due to a movement of at least one wheel of the two-wheeled vehicle is determined. The wheel movement is preferably determined with the aid of a wheel-speed sensor. The possible tilt angle range, in particular the critical tilt angle, for the ascertained coefficient of friction is determined on the basis of the laws of Kamm's Circle. The critical tilt angle particularly is the tilt angle at which at least one of the wheels of the two-wheeled vehicle loses contact with the roadway.

It is particularly preferred that the information is indicated to the driver in an acoustic and/or haptic manner. This offers the advantage that the information is output to the driver in such a way that the driver is able to continue focusing his attention on a driving scenario. It is therefore avoided that the driver takes his eyes off the driving situation and that his attention is distracted as a result. For example, it is possible to output an acoustic signal via at least one loudspeaker which is disposed on the two-wheeled vehicle, e.g., on an instrument panel of the two-wheeled vehicle.

It is also possible that the information is transmitted to the driver via radio to an audio system that is integrated into a motorcycle helmet. The acoustic information is preferably indicated by a temporal sequence of identical tones. The signal is generated haptically, for example by a vibration on a motorcycle component, such as a vibration of at least one accelerator throttle, on at least the brake handle, or on a seat bench. It is also possible that a vibration is generated on a piece of equipment of the driver, for instance on the motorcycle suit of the driver.

It is particularly preferred that the information is optically indicated to the driver. This has the advantage that the driver quickly grasps the information through a simple glance. The optical information is preferably displayed on an instrument panel of the motorcycle. Preferably, the optical information is displayed with the aid of an illumination element such as an LED. Alternatively or additionally, the information is preferably displayed on the visor of the motorcycle helmet, which means that the driver receives the information and is still able to keep his attention on the driving situation at the same time.

It is preferably provided that at least one number is displayed to the driver in order to represent the determined distance. This has the advantage that the driver obtains specific information with regard to the distance. The number preferably indicates the distance or the difference between the instantaneous tilt angle and the critical tilt angle. Additionally or alternatively, it is possible to display the instantaneous tilt angle by a first number and the critical tilt angle by a second number.

It is particularly preferred that at least one graphic display or a symbol for representing the determined distance is displayed to the driver. This has the advantage that a display of the information becomes particularly vivid for the driver. The term 'graphic display' refers to images or also sequences made up of multiple images.

According to one preferred further development of the present invention, it is provided that the determined distance is indicated to the driver by at least one status pointer and/or one status bar. This has the advantage that the driver is easily able to obtain an overview of the information or the distance, in particular without having to read or analyze numbers in the process. The status pointer and/or the status bar preferably move(s) within a scale or within a value range, which extends from a safe range to a critical range. The starting point of the safe range preferably corresponds to a balanced position of the two-wheeled vehicle, which it assumes when driving straight ahead or during a standstill, for example, i.e. when the vertical axis of the two-wheeled vehicle is aligned parallel to the direction of the force of gravity. Using the safe range as the starting point, preferably the length of the status bar and/or the position of the status pointer change(s) as a function of the distance from or the proximity of the instantaneous tilt angle to the critical tilt angle. The status bar is preferably developed as a straight or curved bar, e.g., as an annulus sector.

In an especially preferred manner, it is provided that at least one pointer, which is moved along the status bar as a function of the instantaneous tilt angle and/or the determined distance, is allocated to the status bar. This offers the advantage that the driver always obtains information as to how large the determined distance is from the critical tilt angle that ensures safe driving. The status bar preferably has a rigid development and its length cannot be changed, the pointer moving within the status bar and indicating the distance from or the proximity of the instantaneous tilt angle to the critical tilt angle. The starting point of the status bar preferably corresponds to the balanced position of the two-wheeled vehicle, and the end point of the status bar preferably corresponds to the critical tilt angle. The pointer is preferably developed as an arrow or as a point.

It is especially preferred that a scale is allocated to the status bar, the scale preferably being displayed as a color scale in the status bar. This has the advantage that the driver is quickly able to judge the distance to the critical tilt angle as a function of the color to which the pointer is pointing. For example, the color green in the status bar is allocated to the neutral position of the two-wheeled vehicle and the color red is allocated to the critical tilt angle. The color scale preferably has a continuous color transition from green to red with any number of different colors in-between. Alternatively, the scale has any number of discrete colors.

It is especially preferred that the status bar is subdivided into at least two warning-stage segments as a function of the critical tilt angle, and that each warning-stage segment is given its own color. This offers the advantage that the driver of the two-wheeled vehicle is able to judge the risk of a fall directly at the color-marked warning-stage segments. The driver is therefore able to directly assess the safety of his or her instantaneous riding behavior so that it is particularly easy to carry out a driving correction in order to pass through a curve at an optimum instantaneous tilt angle. Thus, even without long riding experience, the driver is able to assume an optimum tilt angle during cornering. The warning-stage segments are preferably of identical size. Alternatively, the warning-stage segments differ and/or are varied during an operation as a function of marginal conditions, e.g., an updating of the critical tilt angle. In particular, the dimensions of the warning-stage segments are adapted through an input of tire parameters, e.g., by downloading the tire parameters from an external computer network. At least one warning-stage segment is preferably represented by a text field or by an individual warning comment.

The device according to the present invention for operating a two-wheeled vehicle, in particular a motor cycle, on a roadway, is characterized by a control unit that is specifically developed to carry out the method according to the present invention when used as intended. This results in the already mentioned advantages.

DETAILED DESCRIPTION

Figure 1:
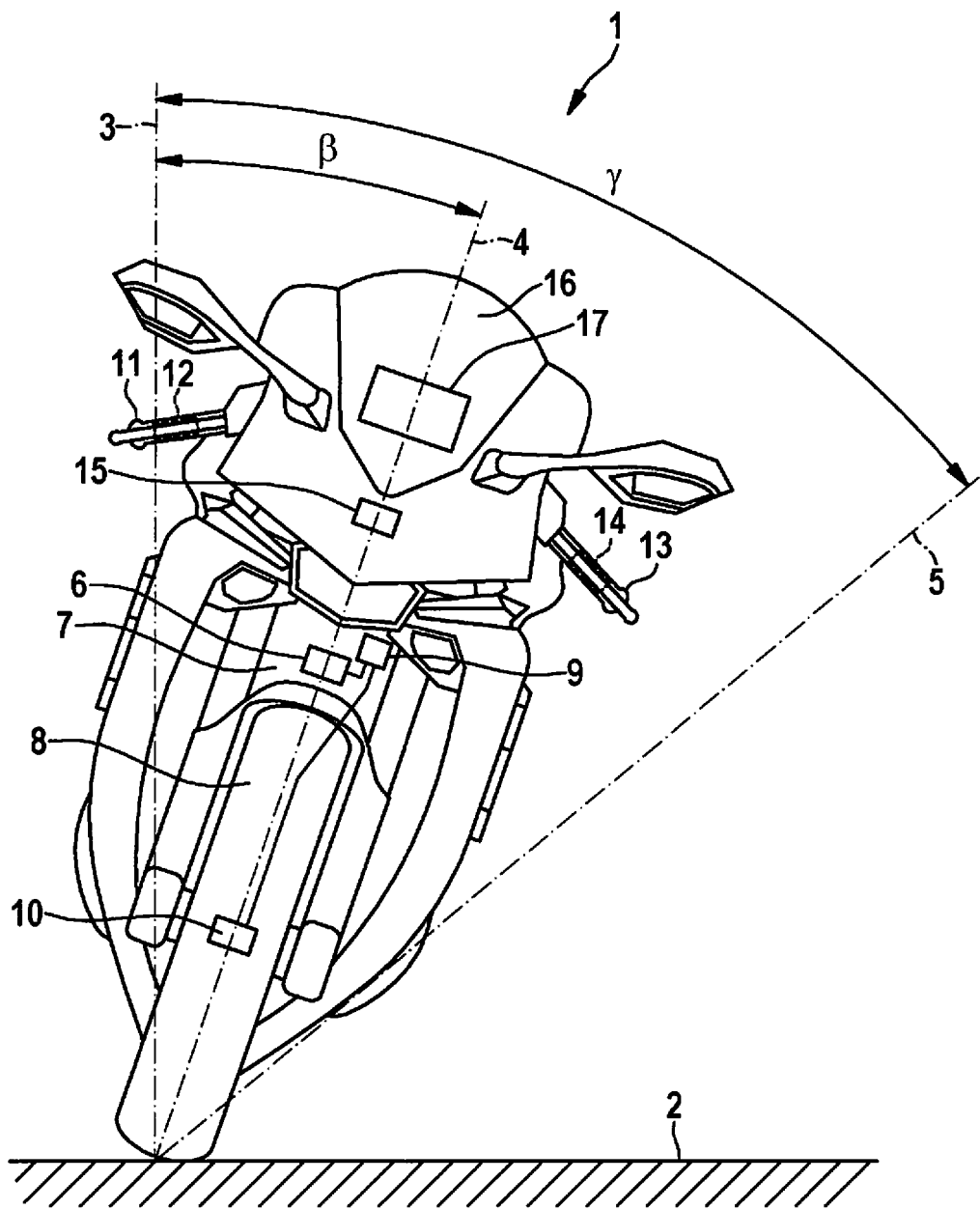
FIG. 1 shows a two-wheeled vehicle in a simplified frontal view according to one exemplary embodiment.

FIG. 1 shows a two-wheeled vehicle 1, in particular a motorcycle, which is passing through a bend (not shown here) on a roadway 2. The roadway normal 3 is situated at a right angle to roadway 2. A line marks vertical axis 4 of two-wheeled vehicle 1. Vertical axis 4 and roadway normal 3 enclose an angle β, β indicating an instantaneous tilt angle of two-wheeled vehicle 1. A line 5 shows the position of a critical tilt of vertical axis 4 of two-wheeled vehicle 1 in a bend at which two-wheeled vehicle 1 loses the adhesion to roadway 2 or possibly also the balance and drops onto roadway 2. Hence, angle γ, which lies between line 5 and roadway normal 3, is referred to as critical tilt angle γ.

To determine instantaneous tilt angle β, two-wheeled vehicle 1 preferably has a sensor 6, which is mounted on a fender 7 of a wheel 8 in this instance, in particular on a front wheel 8. For example, sensor 6 is a rotational-speed sensor and/or an acceleration sensor. The signals from sensor 6 are transmitted to a control unit 9 where they are evaluated.

Front wheel 8 and/or a rear wheel (not shown here) of two-wheeled vehicle 1 has/have at least one rotational-speed sensor 10 in each case, and an instantaneous coefficient of friction between at least front wheel 8 of two-wheeled vehicle 1 and roadway 2 is ascertained for each acceleration or braking operation as a function of the respectively detected rotational speed. Control unit 9 receives the signals from rotational-speed sensor 10 so that critical tilt angle γ is able to be calculated as a function of at least the instantaneous coefficient of friction.

A handlebar grip 11 preferably has a signaling device 12, and/or a handlebar grip 13 has a signaling device 14, signaling device 12, 14 being developed to generate a signal that a driver of two-wheeled vehicle 1 is able to haptically perceive. A vibration device having a vibration motor is preferably provided as a signaling device 12, 14. Alternatively or additionally, it is possible that haptic signaling device 12, 14 is disposed at some other location of two-wheeled vehicle 1 such as in a region of a driver seat of two-wheeled vehicle 1.

Alternatively or additionally, two-wheeled vehicle 1 has at least one acoustic signaling device 15, which preferably is situated in a region of an instrument panel 16 of two-wheeled vehicle 1. The acoustic signaling device, for example, is developed as a loudspeaker. Alternatively, it is possible to place acoustic signaling device 15 in a motorcycle helmet of the driver, in which case control unit 9 and acoustic signaling device 15 are then connected to each other, in particular in a wireless manner, via an external data network, such as via Bluetooth or WLAN.

Alternatively or additionally, it is provided that an optical signaling device 17 is disposed in the region of instrument panel 16. Optical signaling device 17 is an LED, for example.

Control unit 9 is preferably developed to determine a distance Δ between instantaneous tilt angle β and critical tilt angle γ with the aid of an algorithm. In the process, control unit 9 controls haptic signaling device 12, 14, acoustic signaling device 15 and/or optical signaling device 17 as a function of the determined distance.

Figure 2:
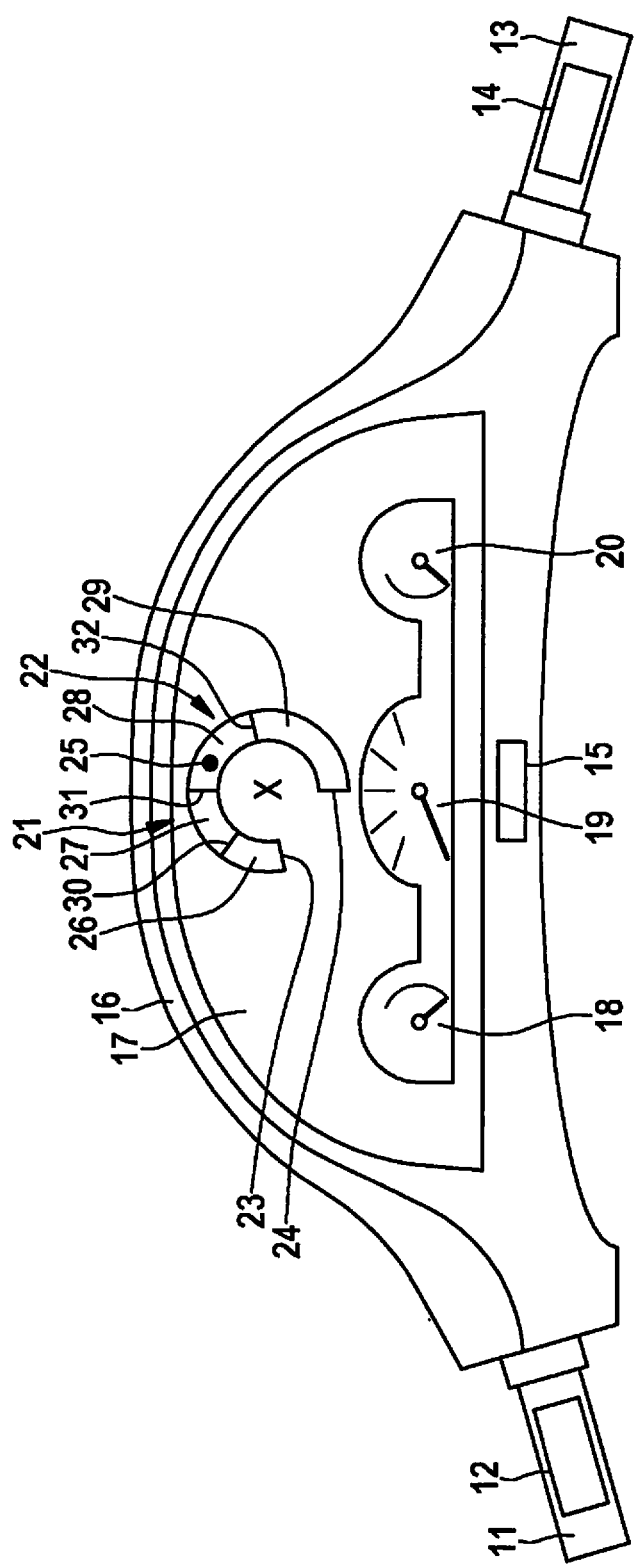
FIG. 2 shows a status bar according to one exemplary embodiment.

FIG. 2 shows instrument panel 16 of two-wheeled vehicle 1 according to one exemplary embodiment. The instrument panel has acoustic signaling device 15. In this particular instance, a rotational speed display 18, a speed display 19, and a motor temperature display 20 are disposed on a display 17 of instrument panel 16. In addition, optical signaling device 21 is located on display 17, optical signaling device 21 indicating to the driver the information pertaining to a distance Δ of instantaneous tilt angle β from critical tilt angle γ.

In this particular instance, optical signaling device 21 is developed as a status bar 22. Alternatively or additionally, it is possible to display optical signaling device 21 in the form of a status pointer.

Status bar 22 is developed as a status bar that represents an annulus sector in this case, and the driver is able to read out an item of information regarding the tilting status of two-wheeled vehicle 1 with the aid of status bar 22. A starting point of status bar 22 is defined at a first location 23, preferably by a balanced position of two-wheeled vehicle 1. The balanced position preferably corresponds to the position that two-wheeled vehicle 1 assumes when vertical axis 4 of two-wheeled vehicle 1 is aligned parallel to the direction of the force of gravity, in this case, parallel to the direction of roadway normal 3 according to FIG. 1, during straight-ahead travel or during a standstill. An end point of status bar 22 at a second location 24 is preferably defined by the value of critical tilt angle γ.

In this particular case, determined distance Δ is displayed to the driver in the form of a number X on the one hand. On the other hand, a pointer 25, which is situated between locations 23 and 24 and allocated to status bar 22, indicates to the driver the position of distance Δ relative to the balanced position and critical tilt angle γ.

A scale is preferably allocated to status bar 22, the scale in this instance being displayed as a color scale in status bar 22.

In the case at hand, status bar 22 is subdivided into four warning stage segments 26, 27, 28, 29. Warning stage segments 26, 27, 28, 29 are preferably separated from one another by separation lines 30, 31, 32 for better clarity. It is possible that a respectively assigned text field having a warning that is allocated to the respective warning stage segment 26, 27, 28, 29 is allocated to each warning stage segment 26, 27, 28, 29. It is preferably provided that different colors are assigned to warning stage segments 26, 27, 28, 29. For example, the color green is allocated to warning stage segment 26, which corresponds to a safe distance Δ of instantaneous tilt angle from critical tilt angle γ. The color red, for example, is allocated to warning stage segment 29, which corresponds to a distance Δ at which there is the risk that two-wheeled vehicle 1 topples over. The color transition between green and red is preferably continuous, and any number of additional colors may preferably be used between green and red.

Through the display with the aid of status bar 22, the driver of two-wheeled vehicle 1 is informed of his or her driving behavior and/or of distance Δ of instantaneous tilt angle β with respect to critical tilt angle γ. The driver is even given the opportunity to recognize how critical instantaneous tilt angle β used by the driver actually is. Subdividing status bar 22 into different warning stage segments 26, 27, 28, 29 enables the driver to recognize a dangerous tilting position or inclination of two-wheeled vehicle 1 and to adapt his or her riding behavior appropriately.

Figure 3:
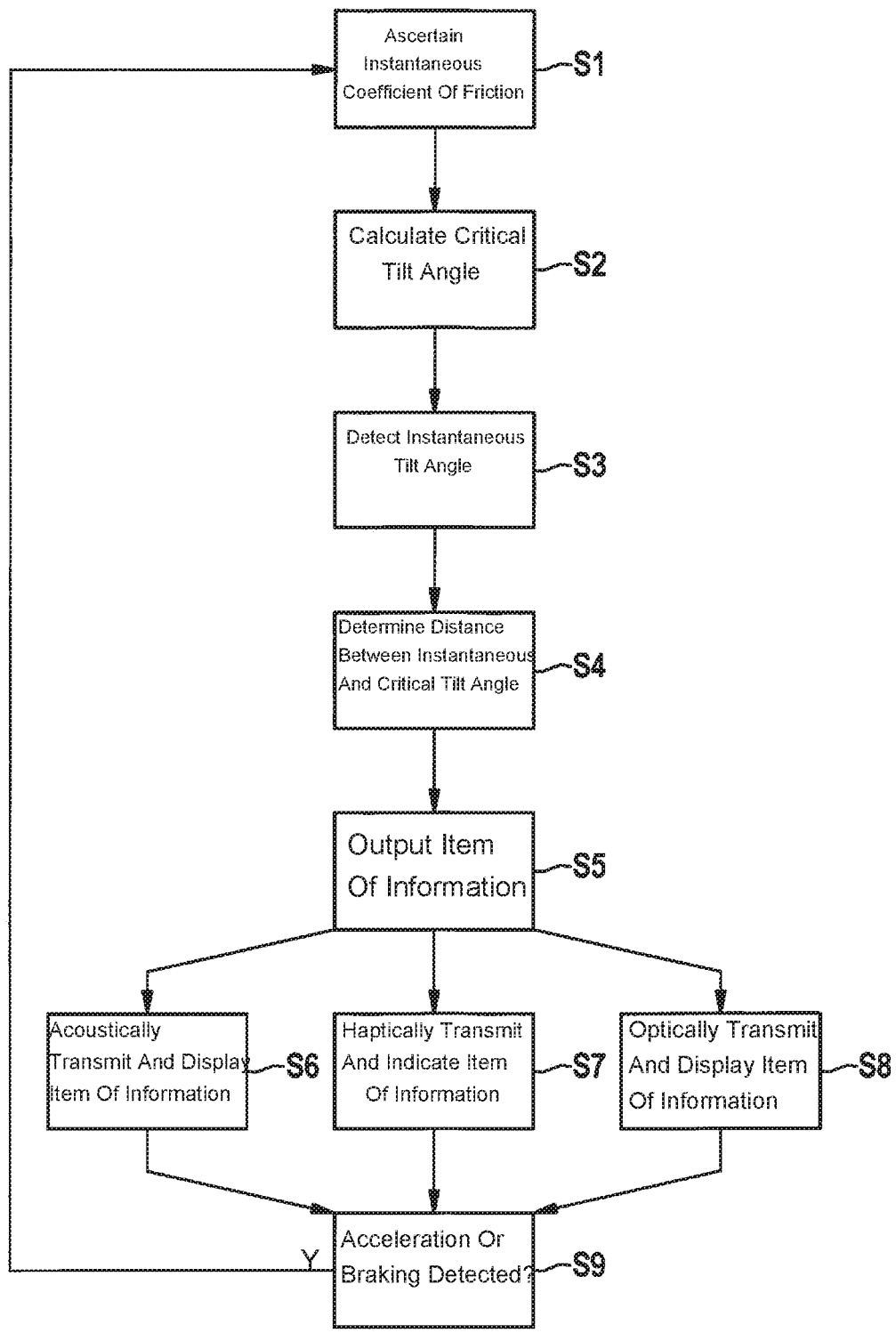
FIG. 3 shows a flow diagram of the present method for operating the two-wheeled vehicle.

FIG. 3 shows a flow diagram for the execution of the method according to one exemplary embodiment.

In a first step S1, an instantaneous coefficient of friction is ascertained during an acceleration or braking operation, using a frictional force between front wheel 8 of two-wheeled vehicle 1 and the surface of roadway 2. In addition, the slip or a slip value due to a movement of at least front wheel 8 of two-wheeled vehicle 1 is determined. The movement of front wheel 8 is preferably determined with the aid of a rotational speed sensor 10. A value that determines the diameter of Kamm's circle, and thus critical tilt angle γ, is determined from the slip value and the coefficient of friction.

In a second step S2, critical tilt angle γ of two-wheeled vehicle 1 is calculated as a function of at least the instantaneous coefficient of friction. The calculation is carried out by control unit 9 with the aid of an algorithm that is preferably a component of the ESP, ABS and/or traction control systems.

In a step S3, instantaneous tilt angle of two-wheeled vehicle 1 is detected. The detection is preferably carried out with the aid of a sensor 6, in particular an acceleration sensor. Instantaneous tilt angle β is preferably determined within a predefinable period of time or within a fraction of a full wheel rotation, e.g., a one-eighth wheel rotation.

In a fourth step S4, distance Δ of instantaneous tilt angle β and critical tilt angle γ is determined by control unit 9.

In a fifth step S5, an item of information is output to the driver of two-wheeled vehicle 1 as a function of determined distance Δ.

The item of information is acoustically transmitted to the driver and displayed in a step S6. For instance, the acoustic display of the item of information takes place with the aid of a loudspeaker 15, which is situated in the area of instrument panel 16 of two-wheeled vehicle 1. The acoustic display is preferably implemented by a reproduction of at least one tone, the temporal interval between two tones becoming shorter with decreasing distance Δ, for example. Alternatively, it is also possible to generate the tone or the tones with the aid of a loudspeaker, the loudspeaker being situated in the motorcycle helmet of the driver.

In a step S7, the item of information is haptically transmitted to the driver and indicated. The haptic indication, for example, is carried out using a vibration of handlebars 12, 14, the saddle of two-wheeled vehicle 1, and/or a vibration on a piece of the motorcycle suit of the driver. For example, at least one glove or a motorcycle jacket of the driver is part of the motorcycle equipment.

In a step S8, the item of information is optically transmitted to the driver and displayed. The display of the information in particular is implemented graphically on instrument panel 16, for instance by an LED whose brightness preferably increases with decreasing distance between instantaneous tilt angle θ and critical tilt angle γ. It is alternatively also possible that the item of information is projected to the driver in his or her motorcycle helmet, in particular onto an inner side of the visor of the motorcycle helmet. However, the display of the information preferably takes place in an area of instrument panel 16 with the aid of bar diagram 22.

If control unit 9 detects in a ninth step S9 that two-wheeled vehicle 1 is accelerated or braked, then the present method is continued in step S1 for a renewed ascertainment of critical tilt angle γ.

Preferably, at least one of steps S6, S7 or S8 is carried out.

Because the driver of two-wheeled vehicle 1 is at all times able to check distance Δ between instantaneous tilt angle θ and critical tilt angle γ, the driver is able to build up trust in his or her own driving. In particular, it teaches the driver to detect his current driving dynamics range and to adapt his driving behavior accordingly. In addition, it allows for reactions especially in critical driving situations that would otherwise be possible only after long riding practice and by experiences gained in the process.

What is claimed is:

1. A method for operating a two-wheeled vehicle on a roadway, comprising:
   a) ascertaining an instantaneous coefficient of friction between at least one wheel of the two-wheeled vehicle and the roadway;
   b) calculating a critical tilt angle of the two-wheeled vehicle as a function of at least the instantaneous coefficient of friction;
   c) detecting an instantaneous tilt angle of the two-wheeled vehicle;
   d) determining a distance between the instantaneous tilt angle and the critical tilt angle; and
   e) outputting an item of information to a driver of the two-wheeled vehicle as a function of the determined distance;
   wherein the instantaneous coefficient of friction is ascertained using a frictional force between a front wheel of the two-wheeled vehicle and a surface of the roadway,
   wherein a slip or a slip value due to a movement of at least the front wheel of the two-wheeled vehicle is determined, wherein the movement of the front wheel is determined with a rotational speed sensor,
   wherein a value that determines a diameter of Kamm's circle and therefore the critical tilt angle is determined from the slip value and the coefficient of friction,
   wherein the critical tilt angle of the two-wheeled vehicle is calculated as a function of at least the instantaneous coefficient of friction,
   wherein the instantaneous tilt angle of the two-wheeled vehicle is detected with an acceleration sensor, and wherein the instantaneous tilt angle is determined within a predefinable period of time and/or within a fraction of a full wheel rotation,
   wherein the outputting of the item of information includes optically displaying, via an optical signaling device, the item of information to the driver, wherein the item of information is to the distance of the instantaneous tilt angle from the critical tilt angle,
   wherein the determined distance is displayed to the driver by a status pointer and a status bar,
   wherein the status bar represents an annulus sector, and the driver is able to read out an item of information regarding a tilting status of the two-wheeled vehicle with the status bar, wherein a starting point of the status bar is defined at a first location, which is a balanced position of the two-wheeled vehicle,
   wherein the balanced position corresponds to the position that two-wheeled vehicle assumes when a vertical axis of the two-wheeled vehicle is aligned parallel to a direction of a force of gravity, and parallel to a direction of the roadway normal during straight-ahead travel or during a standstill, wherein an end point of the status bar at a second location is defined by the value of the critical tilt angle, and
   wherein the determined distance is displayed to the driver as a number, and wherein a pointer, which is situated between the first and second locations and allocated to the status bar, indicates to the driver the position of the distance relative to the balanced position and the critical tilt angle.

2. The method as recited in claim 1, wherein the two-wheeled vehicle is a motorcycle.

3. The method as recited in claim 1, wherein the instantaneous coefficient of friction is ascertained during one of an acceleration operation of the two-wheeled vehicle and a braking operation of the two-wheeled vehicle.

4. The method as recited in claim 1, wherein the outputting of the item of information includes at least one of acoustically indicating the item of information to the driver and haptically indicating the item of information to the driver.

5. The method as recited in claim 1, wherein the optically displaying includes displaying at least one of a graphic and a symbol to the driver for displaying the determined distance.

6. The method as recited in claim 5, wherein a scale is allocated to a status that is displayed as a color scale in the status bar.

7. The method as recited in claim 5, wherein the status bar is subdivided into at least two warning stage segments as a function of the critical tilt angle, each warning stage segment having a different respective color.

8. A device for operating a two-wheeled vehicle on a roadway, comprising:
   a control unit capable of:
   a) ascertaining an instantaneous coefficient of friction between at least one wheel of the two-wheeled vehicle and the roadway;
   b) calculating a critical tilt angle of the two-wheeled vehicle as a function of at least the instantaneous coefficient of friction;
   c) detecting an instantaneous tilt angle of the two-wheeled vehicle;
   d) determining a distance between the instantaneous tilt angle and the critical tilt angle; and e) outputting an item of information to a driver of the two-wheeled vehicle as a function of the determined distance;

wherein the instantaneous coefficient of friction is ascertained using a frictional force between a front wheel of the two-wheeled vehicle and a surface of the roadway, wherein a slip or a slip value due to a movement of at least the front wheel of the two-wheeled vehicle is determined, wherein the movement of the front wheel is determined with a rotational speed sensor, wherein a value that determines a diameter of Kamm's circle and therefore the critical tilt angle is determined from the slip value and the coefficient of friction, wherein the critical tilt angle of the two-wheeled vehicle is calculated as a function of at least the instantaneous coefficient of friction, wherein the instantaneous tilt angle of the two-wheeled vehicle is detected with an acceleration sensor, and wherein the instantaneous tilt angle is determined within a predefinable period of time and/or within a fraction of a full wheel rotation, wherein the outputting of the item of information includes optically displaying, via an optical signaling device, the item of information to the driver, wherein the item of information is to the distance of the instantaneous tilt angle from the critical tilt angle, wherein the determined distance is displayed to the driver by a status pointer and a status bar, wherein the status bar represents an annulus sector, and the driver is able to read out an item of information regarding a tilting status of the two-wheeled vehicle with the status bar, wherein a starting point of the status bar is defined at a first location, which is a balanced position of the two-wheeled vehicle, wherein the balanced position corresponds to the position that two-wheeled vehicle assumes when a vertical axis of the two-wheeled vehicle is aligned parallel to a direction of a force of gravity, and parallel to a direction of the roadway normal during straight-ahead travel or during a standstill, wherein an end point of the status bar at a second location is defined by the value of the critical tilt angle, and wherein the determined distance is displayed to the driver as a number, and wherein a pointer, which is situated between the first and second locations and allocated to the status bar, indicates to the driver the position of the distance relative to the balanced position and the critical tilt angle.

9. The device as recited in claim 8, wherein the two-wheeled vehicle is a motorcycle.

10. A two-wheeled vehicle, comprising:
at least one sensor for detecting an instantaneous tilt angle; and
a device for operating the two-wheeled vehicle on a roadway, the device including:
a control unit capable of:
a) ascertaining an instantaneous coefficient of friction between at least one wheel of the two-wheeled vehicle and the roadway;
b) calculating a critical tilt angle of the two-wheeled vehicle as a function of at least the instantaneous coefficient of friction;
c) detecting an instantaneous tilt angle of the two-wheeled vehicle;
d) determining a distance between the instantaneous tilt angle and the critical tilt angle; and
e) outputting an item of information to a driver of the two-wheeled vehicle as a function of the determined distance;

wherein the instantaneous coefficient of friction is ascertained using a frictional force between a front wheel of the two-wheeled vehicle and a surface of the roadway, wherein a slip or a slip value due to a movement of at least the front wheel of the two-wheeled vehicle is determined, wherein the movement of the front wheel is determined with a rotational speed sensor, wherein a value that determines a diameter of Kamm's circle and therefore the critical tilt angle is determined from the slip value and the coefficient of friction, wherein the critical tilt angle of the two-wheeled vehicle is calculated as a function of at least the instantaneous coefficient of friction, wherein the instantaneous tilt angle of the two-wheeled vehicle is detected with an acceleration sensor, and wherein the instantaneous tilt angle is determined within a predefinable period of time and/or within a fraction of a full wheel rotation, wherein the outputting of the item of information includes optically displaying, via an optical signaling device, the item of information to the driver, wherein the item of information is to the distance of the instantaneous tilt angle from the critical tilt angle, wherein the determined distance is displayed to the driver by a status pointer and a status bar, wherein the status bar represents an annulus sector, and the driver is able to read out an item of information regarding a tilting status of the two-wheeled vehicle with the status bar, wherein a starting point of the status bar is defined at a first location, which is a balanced position of the two-wheeled vehicle, wherein the balanced position corresponds to the position that two-wheeled vehicle assumes when a vertical axis of the two-wheeled vehicle is aligned parallel to a direction of a force of gravity, and parallel to a direction of the roadway normal during straight-ahead travel or during a standstill, wherein an end point of the status bar at a second location is defined by the value of the critical tilt angle, and wherein the determined distance is displayed to the driver as a number, and wherein a pointer, which is situated between the first and second locations and allocated to the status bar, indicates to the driver the position of the distance relative to the balanced position and the critical tilt angle.

11. The two-wheeled vehicle as recited in claim 10, wherein the two-wheeled vehicle is a motorcycle.

* * * * *